March 24, 1953  P. A. MARSAL ET AL  2,632,784
VENTING PRIMARY BATTERY
Filed March 29, 1950

INVENTORS
PAUL A. MARSAL
RUSSELL P. FOX
BY D.C. Harrison
ATTORNEY

Patented Mar. 24, 1953

2,632,784

UNITED STATES PATENT OFFICE 2,632,784

VENTING PRIMARY BATTERY

Paul A. Marsal, Rocky River, and Russell P. Fox, Cleveland, Ohio, assignors to Union Carbide and Carbon Corporation, a corporation of New York Application March 29, 1950, Serial No. 152,584

2 Claims. (Cl. 136—133)

This invention relates to primary galvanic batteries of the dry type and refers more particularly to batteries composed of a plurality of flat cells and to improvements in venting such batteries.

One of the problems which has given battery makers continued difficulty is that of sealing a dry primary cell or battery of cells against leakage of liquid released by the interaction of the chemical components of the cell or battery upon discharge while at the same time providing for the release of internally generated gas. The problem is aggravated in multi-cell batteries and has proved particularly difficult of solution in batteries comprising a plurality of vertically stacked flat cells.

The principal object of the present invention is the provision of improved means for sealing a battery of flat cells against leakage of liquid and also providing improved venting of gas from such battery.

The invention comprises a battery of flat galvanic cells stacked in conventional fashion and provided with a plurality of gas-permeable fibers extending along a side of the stack of cells and communicating with the ambient atmosphere, and a plastic-coated wrapper sealed to the stack of cells and enclosing the gas-permeable fibers. The fibers preferably are in tape form; the tape may be of open mesh material such as cheesecloth or tobacco cloth or may be closely woven.

Figure 1:
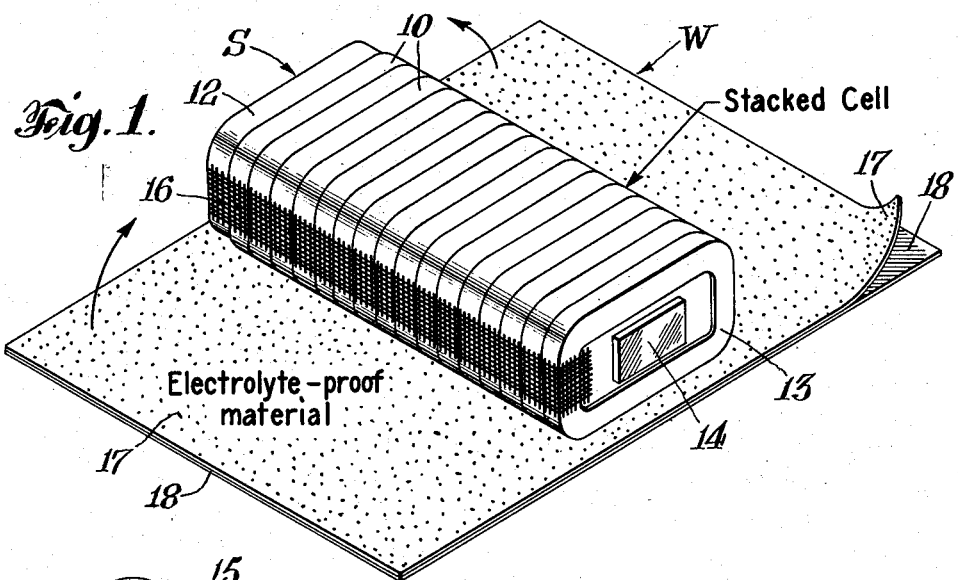
Fig. 1 is a diagrammatic view in perspective of a battery of cells to be sealed in accordance with the invention.
Figure 2:
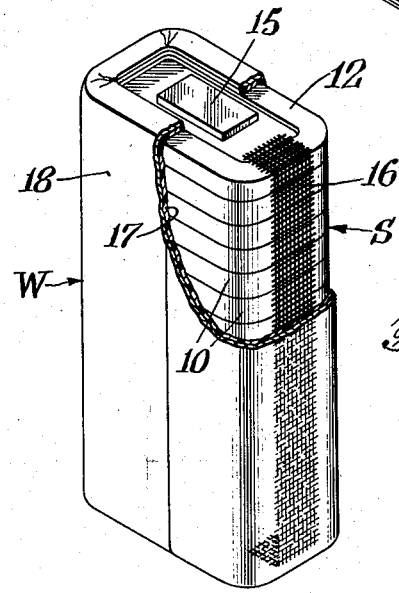
Fig. 2 is an elevational view of a battery embodying the invention, part being broken away.
Figure 3:
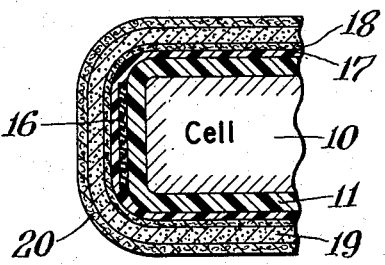
Fig. 3 is a horizontal sectional view of a battery embodying the invention, part being broken away.

Referring to the drawing, a battery embodying the invention may be formed from a stack S assembled in conventional manner from a plurality of individual cells 10. Each of the cells 10 is provided with its individual wrapper or container 11 of thermoplastic material constructed and arranged in conventional manner to provide series contact between the cells 10. Each of the individual cells is identical save for the end cells 12, 13, which are provided with suitable terminals 14, 15. Along at least one side of the stack S is provided a tape 16 composed of gas-permeable fibers. The tape 16 is folded over the end cells 12, 13 toward the center of the stack S so that the ends of the tape 16 communicate with the ambient atmosphere. A wrapper W, preferably having at least two layers 17, 18, at least the inner layer 17 being composed of electrolyte-proof material and preferably of thermoplastic material compatible with the containers or wrappers 11 of the individual cells 10 encloses the stack S and is sealed to the sides of its individual cells. As an additional precaution against leakage, a wax layer 19 (Fig. 3) may be formed about the wrapped battery, for example by dipping the battery in molten wax, and a conventional label 20 then applied.

To assemble a battery embodying the invention, the individual cells 10 and the terminal cells 12, 13 are made and stacked in conventional manner. The tape 16 is then placed in position and may be held temporarily by an adhesive. While the stack of cells is maintained under endwise pressure, the wrapper W is applied and caused to adhere to it, preferably by heat-sealing. The wrapper W must not cover the ends of the longitudinal fibers of the tape 16. A convenient procedure is to apply heat both to the stack of cells and to the wrapper sufficient to cause the thermoplastic containers or wrappers of the individual cells and the thermoplastic layer 17 of the wrapper W to soften sufficiently to unite under the applied pressure, care being taken of course not to heat the cells of the battery to a temperature high enough to damage them. The outer layer 18 of the wrapper W may serve as the label for the battery or as indicated above the battery may be coated with wax and a separate label applied.

Figure 4:
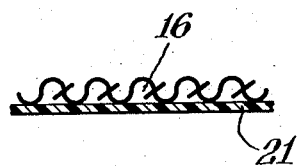
Fig. 4 is a partial view in enlarged detail of an adhesive-coated tape used in one embodiment of the invention.

As above stated, the gas-permeable fibers utilized in the invention are most conveniently applied in the form of a tape which may be of open mesh or may be closely woven. A closely-woven tape is advantageous in providing more fibers. When an open mesh tape is used, the softened plastic 17 of the wrapper W is forced into the interstices of the open mesh tape and is bonded to the individual containers 11 of the cells 10, thus effectively barring any path for escape of liquid. When a closely-woven tape is used, however, it is difficult to force the plastic 17 of the wrapper W through its interstices. In such case therefore, it is desirable to provide a thin, gas-permeable coating of thermoplastic adhesive 21 (Fig. 4) on the side of the tape 16 that is to be sealed to the container 11 of the cells 10.

This adhesive then serves to block the passage of liquid.

Many batteries have been assembled embodying the invention. Such batteries have proved to be substantially free of leakage under all ordinary conditions and have exhibited little or none of the bulging characteristic of insufficiently vented batteries. Any gas internally generated apparently escapes from the individual cells through the interstices between the cells and then is transmitted through the gas-permeable fibers to the ambient atmosphere thereby preventing the increase of pressure within the battery. The electrolyte-proof inner surface of the wrapper prevents escape of liquid.

Based on the tests just mentioned a preferred construction is one in which the containers of the individual cells are composed of a copolymer of vinyl chloride and vinyl acetate, a closely-woven, plastic-coated linen tape is used, and the wrapper is paper which has been coated on one surface (to be the inner surface) with vinyl chloride-vinyl acetate copolymer. In this construction the plastic coating on the wrapper may be 0.003 to 0.006 inch thick.

The fibers utilized in the battery of the invention may be of vegetable or animal origin or may be synthetic, but in any event must be gas-permeable.

We claim:

1. A battery of primary galvanic cells comprising a stack of flat cells assembled under endwise pressure each provided with an individual thermoplastic container, said cells being electrically inter-connected in series; a gas-permeable fibrous tape extending along at least one side of said stack but outside of said cells and communicating with the ambient atmosphere only at at least one end of said stack; and an electrolyte-proof wrapper for said stack, said wrapper being integrally united to said stack and overlying said tape and serving to maintain said stack in endwise compression.

2. A battery of primary galvanic cells comprising a stack of flat cells assembled under endwise pressure each provided with an individual thermoplastic container, said cells being electrically inter-connected in series; a gas-permeable fibrous tape extending along at least one side of said stack but outside of said cells and communicating with the ambient atmosphere only at at least one end of said stack; and an elecrolyte-proof wrapper for said stack, at least the inner surface of said wrapper being composed of thermoplastic material compatible with the said containers of the individual cells of said battery, and said wrapper being integrally united to said stack and overlying said tape and serving to maintain said stack in endwise compression.

PAUL A. MARSAL.
RUSSELL P. FOX.

REFERENCES CITED

The following references are of record in the file of this patent:

UNITED STATES PATENTS

| Number | Name | Date |
|---|---|---|
| 1,487,494 | Tyrrell | Mar. 18, 1924 |
| 1,855,677 | Huntley | Apr. 26, 1932 |
| 1,969,630 | Sprague et al. | Aug. 7, 1934 |
| 2,262,836 | Deibel | Nov. 18, 1941 |
| 2,272,969 | French | Feb. 10, 1942 |
| 2,307,764 | Deibel et al. | Jan. 12, 1943 |

FOREIGN PATENTS

| Number | Country | Date |
|---|---|---|
| 482,363 | Great Britain | Mar. 24, 1938 |